(12) United States Patent
Frye

(10) Patent No.: US 9,433,191 B2
(45) Date of Patent: Sep. 6, 2016

(54) APPLICATOR FOR APPLYING CLEANING, DISINFECTING AND PET CARE SOLUTIONS

(71) Applicant: John Clifton Frye, North Richland Hills, TX (US)

(72) Inventor: John Clifton Frye, North Richland Hills, TX (US)

(73) Assignee: New Way Manufacturing Corporation, North Richland Hills, TX (US)

( * ) Notice: Subject to any disclaimer, the term of this patent is extended or adjusted under 35 U.S.C. 154(b) by 239 days.

(21) Appl. No.: 13/927,455

(22) Filed: Jun. 26, 2013

(65) Prior Publication Data

US 2015/0000609 A1  Jan. 1, 2015

(51) Int. Cl.
*A01K 13/00* (2006.01)
*A46B 11/00* (2006.01)

(52) U.S. Cl.
CPC ............ *A01K 13/003* (2013.01); *A01K 13/001* (2013.01); *A01K 13/002* (2013.01); *A46B 11/0041* (2013.01); *A46B 11/0062* (2013.01); *A46B 2200/1093* (2013.01)

(58) Field of Classification Search
CPC .......... A46B 11/0041; A46B 11/0062; A46B 2200/1093; A46B 5/02; A46B 7/04; A46B 9/005; A01K 13/002; A01K 13/001; A01K 13/003
USPC ....... 119/601, 603, 602, 652, 604, 664, 651, 119/613, 615, 616, 632; 132/112–116; 15/186, 187, 194, 1.52, 113
See application file for complete search history.

(56) References Cited

U.S. PATENT DOCUMENTS

| | | | | |
|---|---|---|---|---|
| 792,278 | A * | 6/1905 | McCarthy | 401/205 |
| 1,064,641 | A * | 6/1913 | Halstead | 401/28 |
| 2,090,050 | A * | 8/1937 | Jackson | 601/154 |
| 3,130,442 | A * | 4/1964 | Kellis | 401/8 |
| D201,428 | S * | 6/1965 | Kellis | D4/114 |
| 3,597,098 | A * | 8/1971 | Kellis | 401/6 |
| 4,543,913 | A * | 10/1985 | Wilkeson | 119/603 |
| D285,130 | S * | 8/1986 | Wilkeson | D30/158 |
| D285,131 | S * | 8/1986 | Wilkeson | D30/158 |
| 4,617,875 | A * | 10/1986 | Holland | 119/603 |
| D328,374 | S * | 7/1992 | Goin | D32/45 |
| D439,052 | S * | 3/2001 | Hay | D4/114 |
| 6,793,434 | B1 * | 9/2004 | Olson | 401/286 |
| 6,948,451 | B2 * | 9/2005 | Bond et al. | 119/665 |
| 7,246,573 | B2 * | 7/2007 | Dunn et al. | 119/632 |
| 7,743,947 | B2 | 6/2010 | Flasch | |
| 7,841,795 | B2 | 11/2010 | Huang | |
| 7,926,492 | B2 * | 4/2011 | Hurwitz | 132/112 |
| 8,082,886 | B2 * | 12/2011 | Hurwitz | 119/603 |
| 8,371,479 | B2 | 2/2013 | Luft | |
| 8,418,654 | B2 * | 4/2013 | Hurwitz | 119/603 |
| 8,684,619 | B2 * | 4/2014 | Uchiyama et al. | 401/270 |
| 8,763,616 | B2 * | 7/2014 | Koptis et al. | 134/93 |
| 8,990,998 | B1 * | 3/2015 | McBride et al. | 15/228 |
| 9,032,583 | B2 * | 5/2015 | McLaughlin et al. | 15/210.1 |
| 2006/0133886 | A1 * | 6/2006 | Willinger et al. | 401/186 |
| 2010/0143024 | A1 * | 6/2010 | Hurwitz | 401/270 |
| 2010/0301136 | A1 | 12/2010 | Scott | |
| 2011/0243643 | A1 | 10/2011 | Huang | |

* cited by examiner

*Primary Examiner* — Yvonne Abbott-Lewis
(74) *Attorney, Agent, or Firm* — William Lovin & Associates, LLC; William R. Lovin

(57) ABSTRACT

The present invention relates to a device that integrates a manually operable fluid dispenser for dispensing and applying a contained fluid to clean and/or disinfect a surface or care for a pet's fur coat. The device is preferably equipped with washable and reusable cleaning pads or various combing and brushing appliances thus obviating the need for a separate cleaning cloth or brush/comb.

10 Claims, 3 Drawing Sheets

APPLICATOR FOR APPLYING CLEANING, DISINFECTING AND PET CARE SOLUTIONS

CROSS-REFERENCE TO RELATED APPLICATIONS

This application takes benefit of U.S. Provisional App. No. 61/664,480 filed Jun. 26, 2012 which is hereby included in its entirety by reference.

FIELD OF THE INVENTION

The present invention relates to devices that integrate a fluid dispenser and means for applying the solution dispensed to clean and/or disinfect a surface or care for a pet's fur coat.

BACKGROUND OF THE INVENTION

Spray applicators, towels, and sponges have been used for decades as staple items when faced with the task of cleaning a table or bar, as in the home or a restaurant. Over time, various innovations have been made which attempt to integrate a device that applies a cleaning solution with a device that distributes the cleaning solution over the surface and wipes or scrubs the surface to be cleaned. The prior art offers many examples: U.S. Pat. No. 7,743,947, U.S. Pat. No. 8,371,479, and U.S. Pat. App. 2010/0301136 are typical. All of these inventions disclose a device that includes a hand-pump sprayer for applying a cleaning solution integrated with a dispenser for wipes to be used to distribute the cleaning solution over the surface while cleaning and scrubbing it. The principle drawback of these—and numerous other devices like them—is that the user must hold the wipe in his hand while using it thus allowing the cleaning solutions to contact the user's hand. While most cleaning solutions are relatively benign chemically, some are less so, and repeated contact with the skin is unhealthy. Similarly, devices to apply grooming solutions or insecticides to a pet's fur coat are also well known. Generally, such approaches offer numerous other practical disadvantages. Specifically: 1) Paper towels are used once, and then discarded. This adds to the total cost of use and creates excess refuse in already overburdened landfills; 2) Since fluid is applied directly to the paper towel, by necessity some of it must also be discarded with the towel, thus leading to overuse and waste of the fluid; 3) The paper towels ordinarily used with such devices do not clean particularly well, in some cases leaving up to 99% more contaminant on "cleaned" surfaces than alternative materials such as microfiber cloth; and, 4) The mechanical pumps used in these devices invariably break, thus necessitating a replacement device and adding to the total cost of operation and the amount of refuse generated.

Several devices have been invented that seek to solve this problem—albeit in very specialized—applications. U.S. Pat. App. 2011/0243643 and U.S. Pat. No. 7,841,795 disclose such devices. The former comprises a handheld scrubber with scrubbing pad attached to the bottom of the device and a cavity for receiving a separate spray bottle of cleaning solution. The user actuates the sprayer with his finger, and the spray is directed through the bottom of the device onto the back of the pad. The latter device comprises a roller cleaner with adjoining cavity for receiving a separate spray bottle of cleaning solution. The user actuates the sprayer with his finger, directs the spray at the surface to be cleaned, and then uses the roller to clean the surface and remove the cleaner. This device has the disadvantage of not allowing the user to scrub the surface to be cleaned and is thus suitable only for delicate surfaces—such as flat-panel displays. Both of these devices have the disadvantage of utilizing a separate spray bottle for cleaner. This has the same disadvantage as discussed above: That the mechanical pumps used in these devices break, thus necessitating a replacement device. Also, such separate bottles are easy to misplace and contain only limited amounts of cleaning solution.

Other devices that seek to combine the bottle containing the cleaning solution with the applicator pad are known in the prior art. One device comprises a squeeze bottle with applicator pad attached to the open neck. The user squeezes the bottle, saturates the pad and then cleans the surface. Such devices mimic similar devices for dispensing shoe polish, paint, and the like. However, these devices are generally unsuitable for cleaning solutions because as the user scrubs the surface to be cleaned, he naturally grips the bottle more tightly, thus squeezing the bottle and dispensing excess cleaning fluid from the bottle. Moreover, placed as it is at the end of the device, the pads tend to be small and unsuited for dealing with large surfaces. One device in the prior art used to apply pet shampoo addresses many of these issues but fails to include a mechanism for changing cleaning pads or applicator appliances, thus rendering it a single purpose device.

It is thus an object of the present invention to provide a hand-held applicator for cleaning, disinfecting, and pet care solutions that: 1) Contains the solution; 2) Provides a sufficiently large surface for cleaning, scrubbing and/or applying the solution to a surface; 3) Uses pads and applicator appliances that are changeable, washable, and thus reusable many times; 4) Reduces the amount of solution actually used, since pads and applicator appliances are reusable, and solution is not thrown away with pads as they are disposed of; 5) Cleans surface contaminants far better than existing cleaners; and, 6) Provides a means of accurately metering the amount of solution applied to the surface.

SUMMARY OF THE INVENTION

The present invention is comprised of a shallow generally rectangular prism, conveniently held in the hand, with curvilinear concave surfaces forming the two longer sides and essentially flat, or curvilinear convex surfaces forming the two shorter sides. Preferably, the baseplate of the device is flat and at least partially covered with Velcro® hooks for interconnection with Velcro® loops present on the mating surface of various available cleaning, scrubbing, and applicator pads and appliances. The top surface of the device is slightly convex to better fit the palm of the hand The device can be constructed in numerous different variants. Several of these are described in detail in the following sections. Nevertheless, all variants have the same essential elements in common. To wit: 1) The body of the device is semi-rigid molded plastic or other suitable material. Such materials are preferred over more flexible variants in that semi-rigid materials resist deformation when the user is vigorously scrubbing a surface. Resistance to deformation while in use is important in that it allows the user to more accurately meter the amount of solution applied to the surface; 2) The body of the device possesses one or more discharge ports through the baseplate where the pad is attached. These discharge ports allow the user to spray solution from the integral tank, through the baseplate of the device and onto the surface; 3) The device is equipped with a means of pressurizing the solution contained in the device such as a pump sprayer mechanism that is integrally molded with or otherwise affixed to, the device such that the sprayer dispenses fluid through the discharge port(s) in the baseplate. This pressurizing means may be integrally formed into the device and actuated by squeezing all or some portion of the device, or in the alternative, the sprayer may be a spring operated T-handle, button, or equivalent pump device, suitable for actuation by the fingers of the human hand; and, 4) A multiplicity of cleaning, scrubbing, and applicator pads and appliances for use with the various fluids that may be dispensed. As discussed earlier the baseplate of the device is at least partially covered with Velcro® hooks designed to interconnect with mating Velcro® loops on the back surface of the pads and appliances. It will be readily apparent however that Velcro® hook and loop fasteners are but one of a large number of equivalent means for removably affixing a pad or appliance to the device. Pads and appliances are available in a variety of materials and shapes. Some are available with course material on the exposed side and are thus more suitable for scrubbing tasks. Some are available composed exclusively of microfiber cloth and thus suitable for general wiping and cleaning tasks. Some are available with a combination of both materials. Some are available with semi-rigid tooth-like projections suitable for use as a brush, or comb.

All variants of the present invention are used the same way. Specifically: 1) The user selects a particular type of cleaning, scrubbing, or applicator pad or appliance and affixes it to the baseplate of the device. Since the pad has one or more holes that coincide with the discharge ports formed in the baseplate of the device, the user ensures that the device and the pad are aligned properly before affixing the pad; 2) The user holds the device in his hand between his thumb and the fingers of the hand; 3) The user points the baseplate discharge port(s) towards the surface to which the solution is to be applied, and activates the pump by either: a) Squeezing the device between the thumb and the fingers of the hand; or, b) Repeatedly pressing the pump with the first and second fingers to apply solution to the surface; 4) The user then places the device on the surface and passes the device over the surface to distribute the fluid. Should additional solution be required, without lifting the device from the surface the user actuates the pump to apply additional solution to the surface while in the act of passing the device over the surface to distribute the solution; 5) If the user encounters areas that require additional applicator pressure, the user may lift the back edge of the device to amplify the downward force applied to the surface via the front edge of the device. By this means, the user can vigorously scrub a particular part of the surface. When done, the user simply places the entire baseplate of the device against the surface and continues to distribute solution evenly over the surface; and, 6) With some types of cleaning and scrubbing pads, after the user has cleaned a number of surfaces, the user detaches the pad from the device and deposits it in the nearest washing machine for cleaning. The user then affixes a new cleaning pad to the baseplate of the device and continues.

DETAILED DESCRIPTION OF THE EMBODIMENTS

Figure 1:
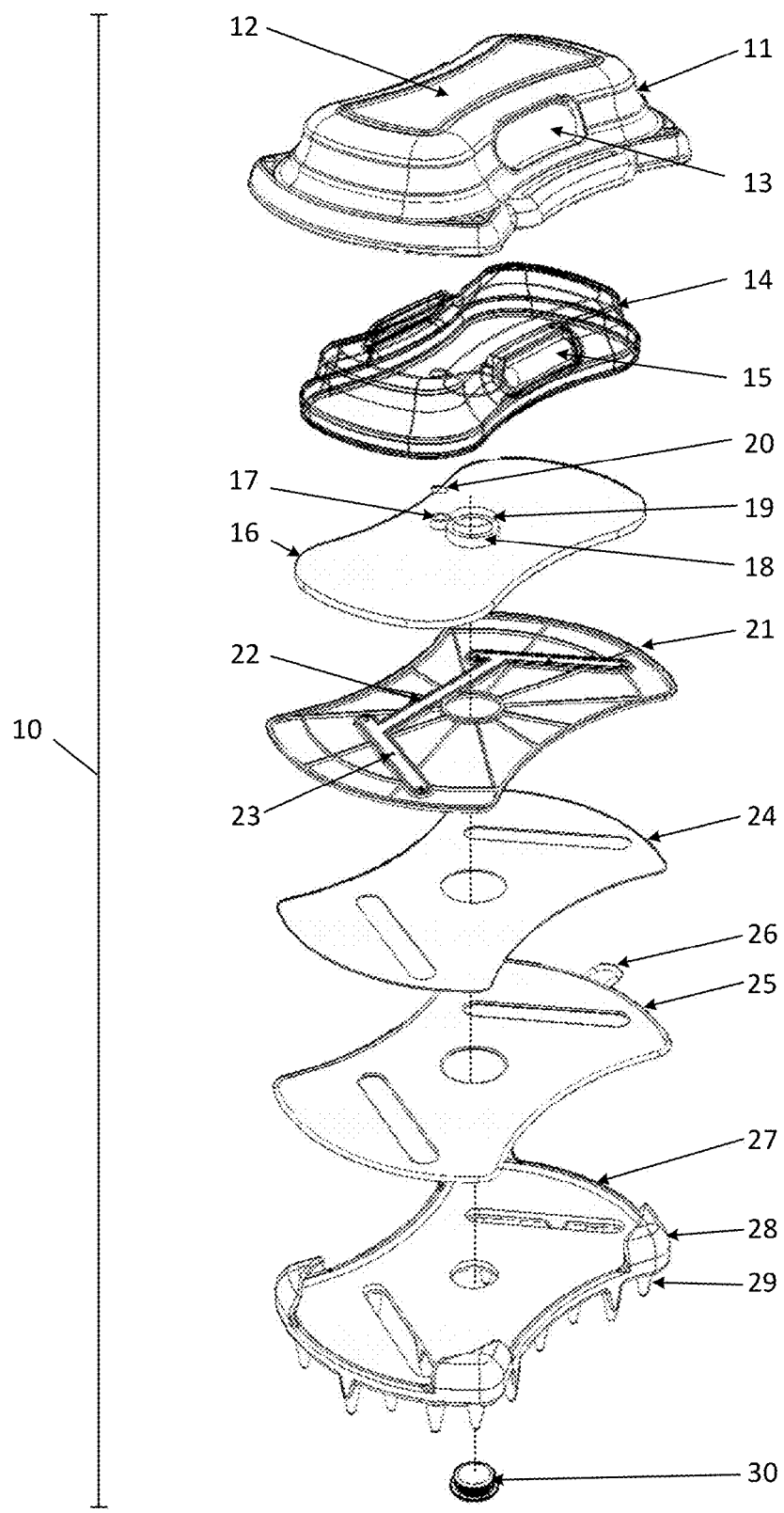
FIG. 1 comprises an isometric, exploded view of the preferred embodiment of the present invention.
Figures 2A, 2B:
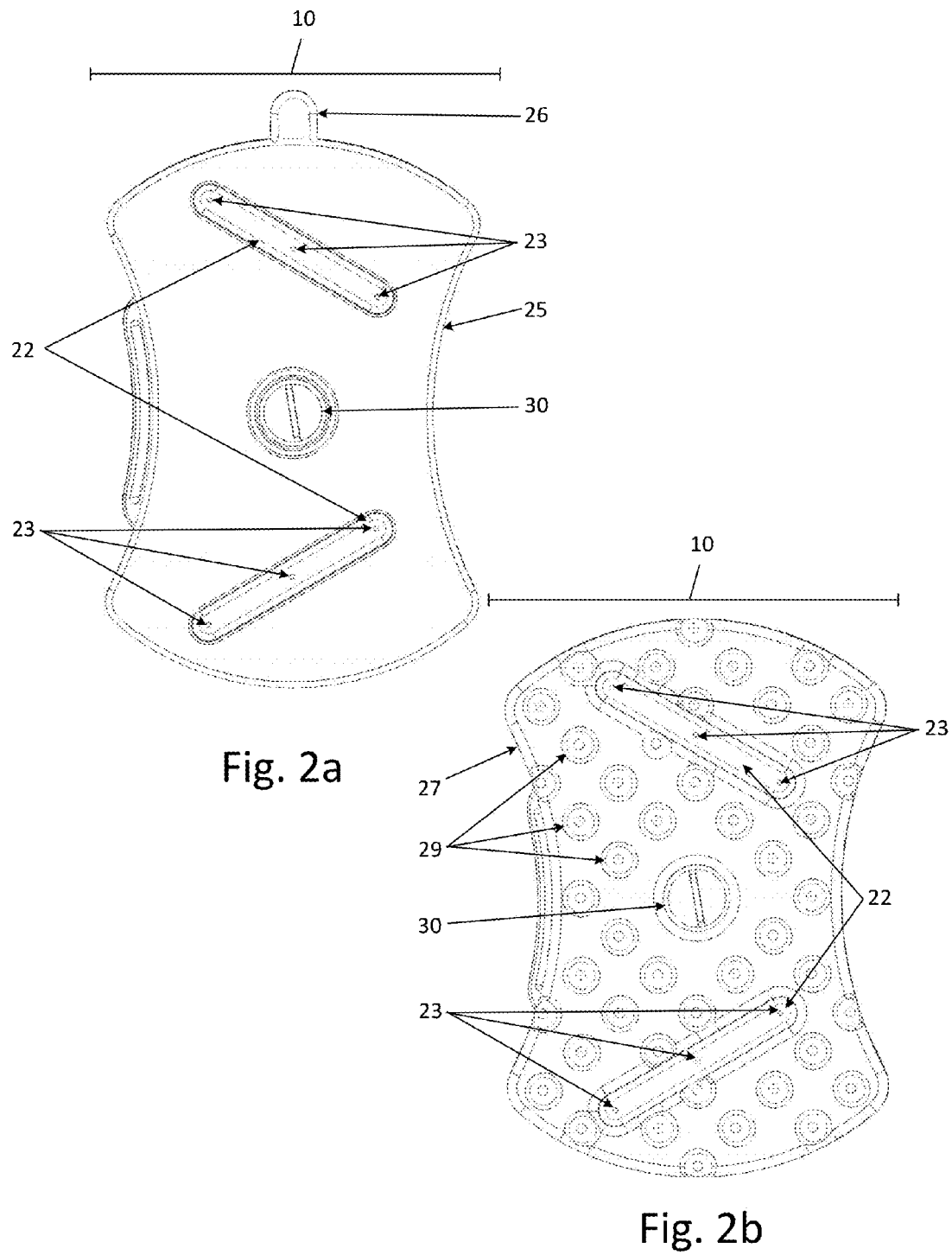
FIGS. 2a and 2b comprise bottom views of the preferred embodiment of the present invention with a cleaning pad and a toothed pad, respectively.
Figure 3A:
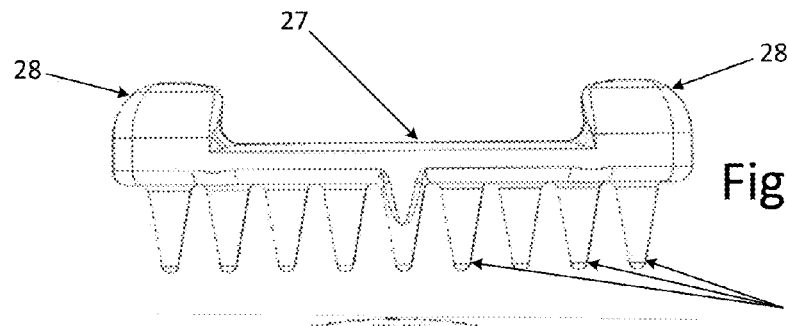
FIGS. 3a, 3b, and 3c comprise an end elevation view, a top plan view, and a side elevation view, respectively, of a toothed pad in accordance with the preferred embodiment of the present invention.
Figure 3B:
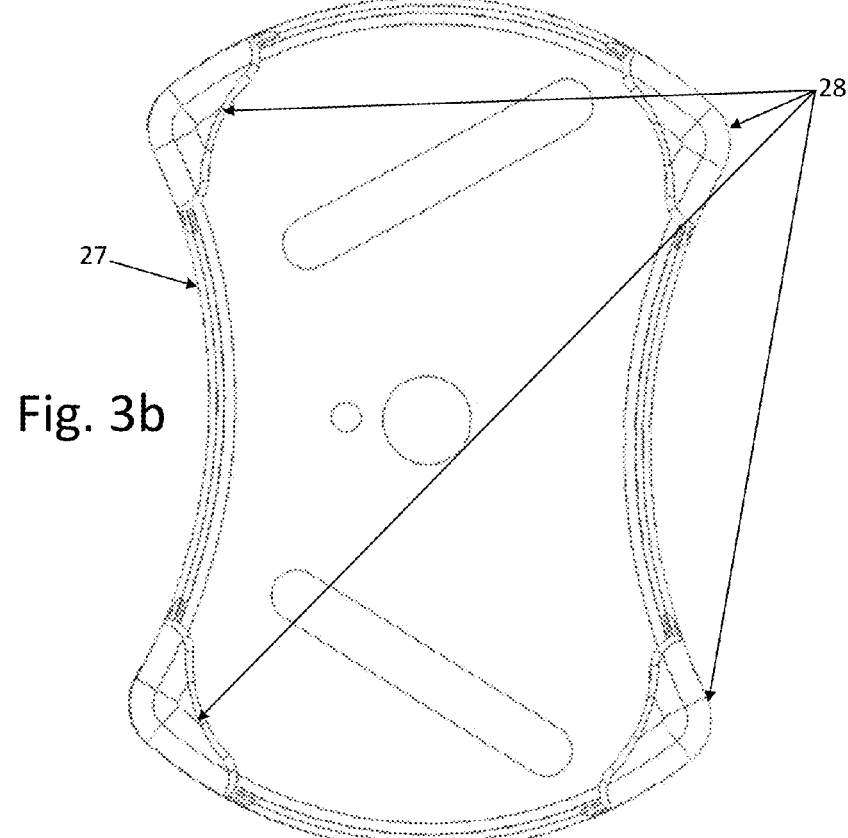
Figure 3C:
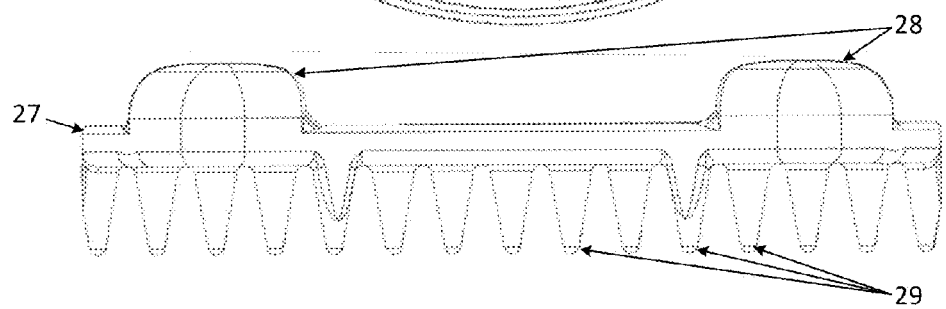

Referring now to FIGS. 1, 2a, 2b, 3a, 3b, and 3c, a preferred embodiment of the present invention suitable for the application of cleaning, disinfecting, and pet care solutions to a surface is disclosed. Device 10 is in the general form of a shallow, rectangular prism, conveniently held in the hand, with curvilinear concave surfaces forming the two longer sides and generally flat or curvilinear convex surfaces forming the two shorter sides. The top of upper housing 11 of device 10 is slightly convex to better fit the palm of the hand. Formed into both of the two longer sides of upper housing 11 are grip point openings 13. Grip point openings 13 provide apertures through which grip points 15 on compressible fluid bladder 14 may be accessed through upper housing 11 so that device 10 may be conveniently held in the hand and compressible fluid bladder 14 may be squeezed. Recessed into the generally flat top surface of device 10 is transparent plastic panel 12. Transparent plastic panel 12 is removable such that a paper or other label may be inserted under transparent plastic panel 12 and viewed after transparent plastic panel 12 has been replaced in device 10. This label may contain information about the various substances packaged in device 10 and instructions and necessary cautions for using the substances. Transparent plastic panel 12 is circumferentially slightly larger than the circumferential periphery of the recessed area of upper housing 11 into which it fits such that transparent plastic panel 12 forms a liquid-tight seal with upper housing 11.

Situated inside device 10 and underneath upper housing 11 is compressible fluid bladder 14. Compressible fluid bladder 14 is constructed of semi-flexible plastic material or the like and may be semi-transparent to visually determine how much fluid is inside compressible fluid bladder 14. Grip points 15 protrude from the lateral aspects of compressible fluid bladder 14 such that when assembled inside upper housing 11, grip points 15 may be accessed through upper housing 11 so that device 10 may be conveniently held in the hand and compressible fluid bladder 14 may be squeezed thus pressurizing the fluid in it.

After compressible fluid bladder 14 is placed in upper housing 11, valve plate 16 is sonically welded or otherwise sealed to the lower circumferential edge of upper housing 11 and the bottom surface of compressible fluid bladder 14 to seal compressible fluid bladder 14 inside the cavity formed between upper housing 11 and valve plate 16. Valve plate 16 contains two apertures that extend slightly through and into the bottom of compressible fluid bladder 14: 1) Valve port 17; and, 2) Fill port 18. Valve port 17 is equipped with resistance valve 20. Resistance valve 20 is rubber or some other elastomeric material and functions by ensuring that fluid in compressible fluid bladder 14 is retained inside compressible fluid bladder 14 only until a sufficient pressure is manually applied to grip points 15 to pressurize the fluid inside compressible fluid bladder 14 to overcome the retaining force offered by resistance valve 20. After applying sufficient manual force to grip points 15 to overcome the retaining force offered by resistance valve 20, fluid is expelled through valve port 17. When manual force is released from grip points 15, resistance valve 20 closes and fluid is again retained inside compressible fluid bladder 14.

While the preferred embodiment of the present invention features a resistance valve 20 that is non-metered (i.e. does not discharge a fixed, measured quantity of fluid), it will be readily apparent that resistance valve 20 may be metered and allow only fixed, measured quantity of fluid per squeeze of device 10. Such a metered valve may be required when dispensing various pharmaceutical products. Fill port 18 is used to fill compressible fluid bladder 14 with fluid and is internally threaded and equipped with o-ring 19 such that when plug 30 is screwed into fill port 18, plug 30 securely seals compressible fluid bladder 14 to retain fluid inside. While the preferred embodiment of the present invention has fill port 18 and accordingly may be reused, in some applications reuse may not be desirable. In such applications it will be readily apparent that fill port 18, o-ring 19, and plug 30 may be omitted and fluid bladder 14 may be permanently sealed after it has been filled thus preventing reuse.

Sonically welded or otherwise affixed to the bottom of valve plate 16, is baseplate 21. Baseplate 21 contains an aperture allowing plug 30 to be inserted through it and a molded channel 22 that distributes fluid expelled from compressible fluid bladder 14 to a multiplicity of discharge ports 23. Adhesively affixed or otherwise attached to the bottom of baseplate 21, is some means of affixing cleaning pad 25. Preferably, Velcro® pad 24 will be used for this purpose. Velcro® pad 24 has apertures allowing access to plug 30 and ensuring that fluid discharged from discharge ports 23 passes through to the surface below. It will be readily apparent that many other means of affixing cleaning pad 25 or other accessories may be used. For example, cleaning pad 25 or other accessory may be equipped with one or more elastic straps that hold the pad or accessory to the device. Similarly, cleaning pad 25 or other accessory may be equipped with projections on its top surface that mate with interlocking receptacles on the bottom of baseplate 21. In some of these embodiments Velcro® pad 24 may be omitted entirely. Moreover, it will be readily apparent to those having skill in the art that numerous other means of affixing cleaning pad 25 or other accessories to the bottom of baseplate 21 are well known in the art.

Cleaning pad 25 is equipped with finger pull ring 26. Cleaning pad 25 is ordinarily constructed of polyester or polyamide microfiber cloth, but it will be readily apparent that numerous other synthetic and natural textile materials are appropriate for cleaning tasks and many are well known in the art. Microfiber cloth is particularly advantageous, however, because it cleans so much more efficiently than conventional fabric or paper pads and is washable in commercial dishwashers or washing machines, and thus reusable, for long periods of time. This has the added advantages of reducing the amount of material waste generated and reducing the amount of fluid discarded with discarded pads. Clearly, while cleaning pad 25 is ideally constructed such that it may be washed, it will be readily apparent that cleaning pad 25 may be completely non-reusable and disposable in nature. As above, cleaning pad 25 has apertures allowing access to plug 30 and ensuring that fluid discharged from discharge ports 23 passes through. Also, it will be readily apparent that cleaning pad 25 need not be a unitary pad, but rather cleaning pad 25 may be rather a multiplicity of pads stacked one on top of the other and held together by a suitable low-tack adhesive or an equivalent temporary adhering means. In this case, the user uses one pad, then using manual pull ring 26, removes it and begins using the pad underneath, thus allowing the user to keep a clean pad exposed. Also, it will be readily apparent that cleaning pad 25 need not be constructed completely of microfiber material, but rather may be constructed of a multiplicity of materials. For example, cleaning pad 25 may be constructed partially of microfiber material and some other substance, such as sponge, layered together, or in such a way that only a portion of the bottom surface of cleaning pad 25 is made of each material. Similarly, cleaning pad 25 may be constructed partially or completely of spun polypropylene fibrous material. Such materials are available in a wide range of compositions, some augmented with abrasive materials such as Scotch-Brite™.

Another accessory for use with device 10 is combing pad 27. Ordinarily, combing pad 27 will be used to apply pet care products to a pet's fur coat, but applications in which shampoo, hair conditioner, and various hair dyes are applied to the head of a human user are also readily conceivable. Combing pad 27 is ideally molded out of semi-flexible plastic material and is equipped with retaining points 28 such that it can be snapped around the corners of upper housing 11 thus rigidly affixing it to the bottom of device 10. Combing pad 27 is equipped with a number of combing teeth 29. As above, combing pad 27 has apertures allowing access to plug 30 and ensuring that fluid discharged from discharge ports 23 passes through. It will be readily apparent that combing teeth 29 need not all be the same, but rather they may be different in length, number, and overall geometry. Moreover, it will be readily apparent that combing pad 27 need not be constructed completely of semi-flexible plastic material nor need combing teeth 29 cover the full extent of the bottom surface of combing pad 27. For example, one embodiment used to apply insecticide to short-haired animals, such as horses, might have short combing teeth 29 arranged about the periphery of the pad and microfiber material covering the interior portions of the pad.

The preferred embodiment of device 10 is used to clean a surface in the following manner: First, the user affixes cleaning pad 25 to baseplate 21 of device 10 preferably by means of Velcro® hook and loop fasteners present on the bottom of baseplate 21 of device 10 and the back of cleaning pad 25, respectively. Since cleaning pad 25 has apertures that coincide with discharge ports 23 formed in baseplate 21, the user must ensure that device 10 and cleaning pad 25 are aligned before affixing the pad. Next, the user holds device 10 in his hand by grasping opposing grip points 15 between the thumb and the fingers of the hand, respectively. Next, the user orients discharge ports 23 towards the surface to be cleaned and squeezes opposing grip points 15 between his thumb and the fingers of the hand. This pressurizes the fluid inside compressible fluid bladder 14 to a point where the retaining force offered by resistance valve 20 is overcome, thus causing cleaning fluid inside compressible fluid bladder 14 to be discharged through discharge ports 23 and onto the surface to be cleaned. Next, the user places device 10 on the surface to be cleaned and passes device 10 over the surface to clean it. Should additional cleaning solution be required, without lifting device 10 from the surface the user squeezes opposing grip points 15 again to apply additional cleaning solution while in the act of passing device 10 over the surface. If the user encounters areas that require additional cleaning pressure, the user may lift the back edge of device 10 to amplify the downward force applied to the surface via the front edge of device 10. By this means, the user can vigorously scrub a particular part of the surface for extra cleaning effect. Next, after the user has cleaned several surfaces, the user detaches cleaning pad 25 from the device and deposits it in the nearest washing machine for washing.

The user then affixes a new cleaning pad 25 to baseplate 21 of device 10 and continues cleaning.

The preferred embodiment of device 10 is used to apply a pet care product to the coat in the following manner: First, the user affixes combing pad 27 to device 10 by snapping retaining points 28 around the corners of upper housing 11 thus rigidly affixing combing pad 27 to the bottom of device 10. As above, since combing pad 27 has apertures that coincide with discharge ports 23 formed in baseplate 21, the user must ensure that device 10 and cleaning pad 25 are properly aligned before affixing the pad. Next, the user holds device 10 in his hand by grasping opposing grip points 15 between the thumb and the fingers of the hand, respectively. Next, the user orients discharge ports 23 towards the pet's coat and squeezes opposing grip points 15 between the his thumb and the fingers of the hand. This pressurizes the pet care product inside compressible fluid bladder 14 to a point where the retaining force offered by resistance valve 20 is overcome, thus causing pet care product inside compressible fluid bladder 14 to be discharged through discharge ports 23 and onto the pet's coat. Next, the user places device 10 with combing pad 27 on the pet's coat such that combing teeth 29 are insinuated in the pet's coat. Next, the user repeatedly combs the pet's coat to distribute the pet care product into the coat of the pet. Should additional pet care product be required, without lifting device 10 from the surface the user squeezes opposing grip points 15 again to apply additional pet care product while in the act of passing device 10 through the pet's coat.

While the present invention has been described in what are thought to be two of the more useful variants, those skilled in the art will readily recognize that equivalent arrangements are easily constructed. All such variants that seek to alter: 1) The location and number of discharge ports; 2) The type and configuration of cleaning pads and appliances included with the device; 3) The type and number of fasteners used to affix the cleaning pads and appliances to the device; and, 4) The capacity and general shape of the device are included in the spirit and scope of the present invention.

What is claimed is:

1. A novel applicator for applying cleaning, disinfecting, and pet care solutions to a surface, comprising:
    a) a means of affixing a cleaning pad to the bottom surface of said applicator;
    b) a compressible fluid bladder with a hollow cavity to contain a solution;
    c) a closable aperture for introducing and subsequently confining said solution inside said compressible fluid bladder;
    d) a means of manually pressurizing said compressible fluid bladder to expel solution from at least one discharge port on the bottom surface of said compressible fluid bladder wherein said discharge port is fluidically coupled between said hollow cavity and said bottom surface; and
    e) a cleaning pad wherein said cleaning pad is comprised of a multiplicity of cleaning pad elements vertically stacked together and wherein said cleaning pad has at least one perforate opening such that when said cleaning pad is affixed to said bottom surface of said applicator said discharge port is coextensive with said perforate opening in said cleaning pad.

2. A novel applicator of claim 1 for applying cleaning, disinfecting, and pet care solution to a surface wherein said cleaning pad elements are substantially comprised of fabric.

3. A novel applicator of claim 1 for applying cleaning, disinfecting, and pet care solutions to a surface wherein said cleaning pad elements are substantially comprised of microfiber fabric material.

4. A novel applicator of claim 1 for applying cleaning, disinfecting, and pet care solutions to a surface wherein said cleaning pad elements are substantially comprised of spun polyethylene fiber.

5. A novel applicator of claim 1 for applying cleaning, disinfecting, and pet care solutions to a surface wherein said cleaning pad elements are substantially comprised of spun polyethylene fiber augmented with abrasive material.

6. A novel applicator of claim 1 for applying cleaning, disinfecting, and pet care solutions to a surface wherein said cleaning pad elements are comprised of some part fabric and some part spun polyethylene fiber.

7. A novel applicator of claim 1 for applying cleaning, disinfecting, and pet care solutions to a surface wherein said cleaning pad elements are comprised of some part fabric and some part spun polyethylene fiber augmented with abrasive material.

8. A novel applicator of claim 1 for applying cleaning, disinfecting, and pet care solutions to a surface further comprising:
    a) a toothed, combing pad temporarily affixable to said bottom surface of said applicator.

9. A novel applicator of claim 8 for applying cleaning, disinfecting, and pet care solutions to a surface wherein said toothed, combing pad has more than one size and shape of combing teeth.

10. A method of using a novel applicator of claim 1 for applying cleaning, disinfecting, and pet care solutions to a surface to clean a surface, comprising the steps of:
    a) filling a compressible fluid bladder with cleaning solution;
    b) confining said cleaning solution inside said compressible fluid bladder;
    c) affixing a cleaning pad to the bottom surface of said applicator;
    d) squeezing said compressible fluid bladder to expel an amount of said cleaning fluid through a discharge port and onto the surface to be cleaned;
    e) wiping said cleaning pad over said surface to clean said surface; and
    removing the bottommost cleaning pad element of said cleaning pad when said cleaning pad element is soiled.

* * * * *